United States Patent [19]

Garman

[11] Patent Number: 5,237,962

[45] Date of Patent: Aug. 24, 1993

[54] PORTABLE MOBILE RACK AND TROUGH TYPE LIVESTOCK FEEDER

[76] Inventor: Steven L. Garman, R.R. 1, Box 640, Scandia, Kans. 66966

[21] Appl. No.: 945,129

[22] Filed: Sep. 15, 1992

[51] Int. Cl.$^5$ .................................................. A01K 1/10
[52] U.S. Cl. ........................................................ 119/58
[58] Field of Search ................... 119/58, 59, 60, 57.92, 119/52.1; 296/3, 6, 7, 8, 9

[56] References Cited

U.S. PATENT DOCUMENTS

| | | | |
|---|---|---|---|
| 47,472 | 4/1865 | Van Nest | 119/58 |
| 390,259 | 10/1888 | Schwartz | 119/58 |
| 872,032 | 11/1907 | Tolle | 119/58 |
| 1,081,662 | 12/1913 | Docherty | 119/58 |
| 3,565,044 | 2/1971 | Sorrels | 119/53 |
| 3,782,333 | 1/1974 | Feterl | 119/58 |
| 3,851,624 | 12/1974 | Peak | 119/60 |
| 3,906,901 | 9/1975 | Cox | 119/58 |
| 3,949,706 | 4/1976 | Coon, Jr. | 119/58 |
| 3,999,520 | 12/1976 | Feterl | 119/58 |
| 4,020,794 | 5/1977 | Nethery | 119/58 |
| 4,312,297 | 1/1982 | Roberts | 119/53 |
| 4,930,449 | 6/1990 | Harton | 119/60 |

FOREIGN PATENT DOCUMENTS

| | | | |
|---|---|---|---|
| 429892 | 6/1926 | Fed. Rep. of Germany | 119/58 |
| 1491236 | 11/1977 | United Kingdom | 119/58 |
| 2152349 | 8/1985 | United Kingdom | 119/58 |

*Primary Examiner*—Gene Mancene
*Assistant Examiner*—Todd E. Manahan
*Attorney, Agent, or Firm*—John R. Flanagan

[57] ABSTRACT

A portable mobile livestock feeder includes a pair of feeding troughs for holding a flowable granular-type of feed material, a feeding hopper for holding a stem roughage-type feed material, and a mobile chassis for supporting the feeding troughs and the feeding hopper in a generally level stationary relation to the ground surface and for movement across the ground surface. The feeding troughs extend longitudinally in laterally spaced relation to one another and have open tops through which livestock can reach to eat the granular-type feed material from the feeding troughs. The feeding hopper has a bottom floor positioned between the feeding troughs at the level of the open tops of the feeding troughs. The feeding hopper also has an enclosure mounted on and extending above the floor and the feeding troughs. The enclosure includes a plurality of spaced vertical side openings extending above the feeding troughs through which livestock can reach above and over the feeding troughs to eat roughage-type feed material from the feeding hopper.

7 Claims, 1 Drawing Sheet

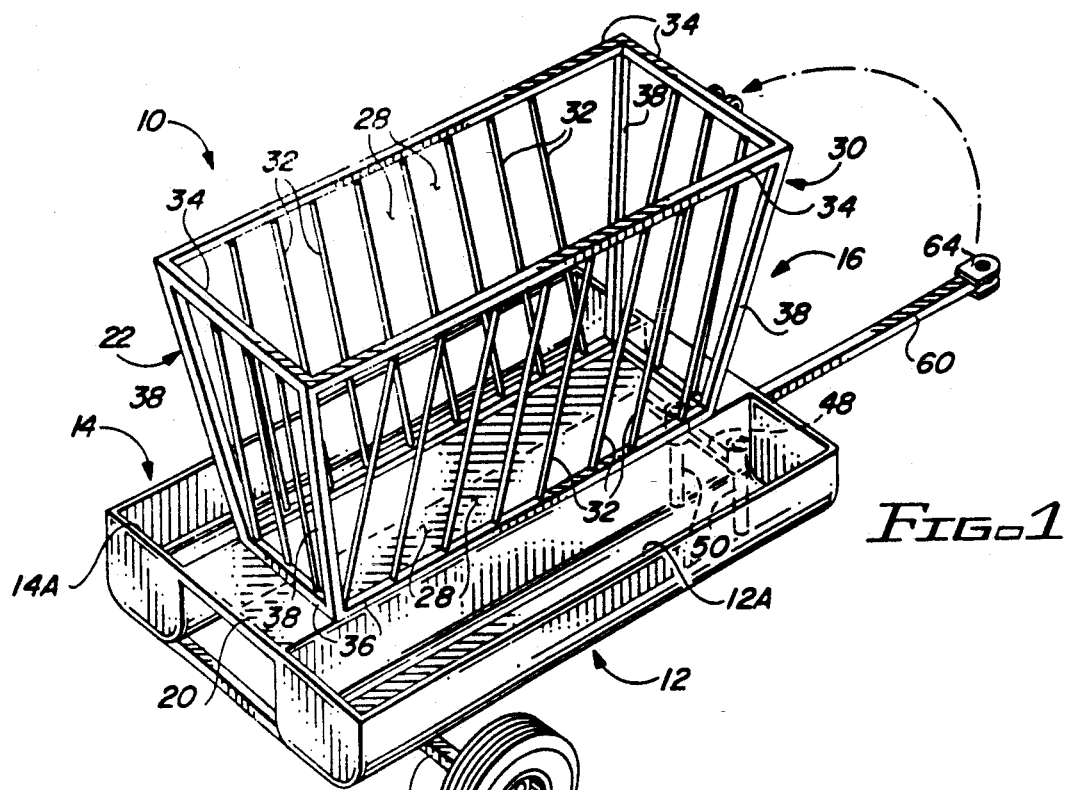
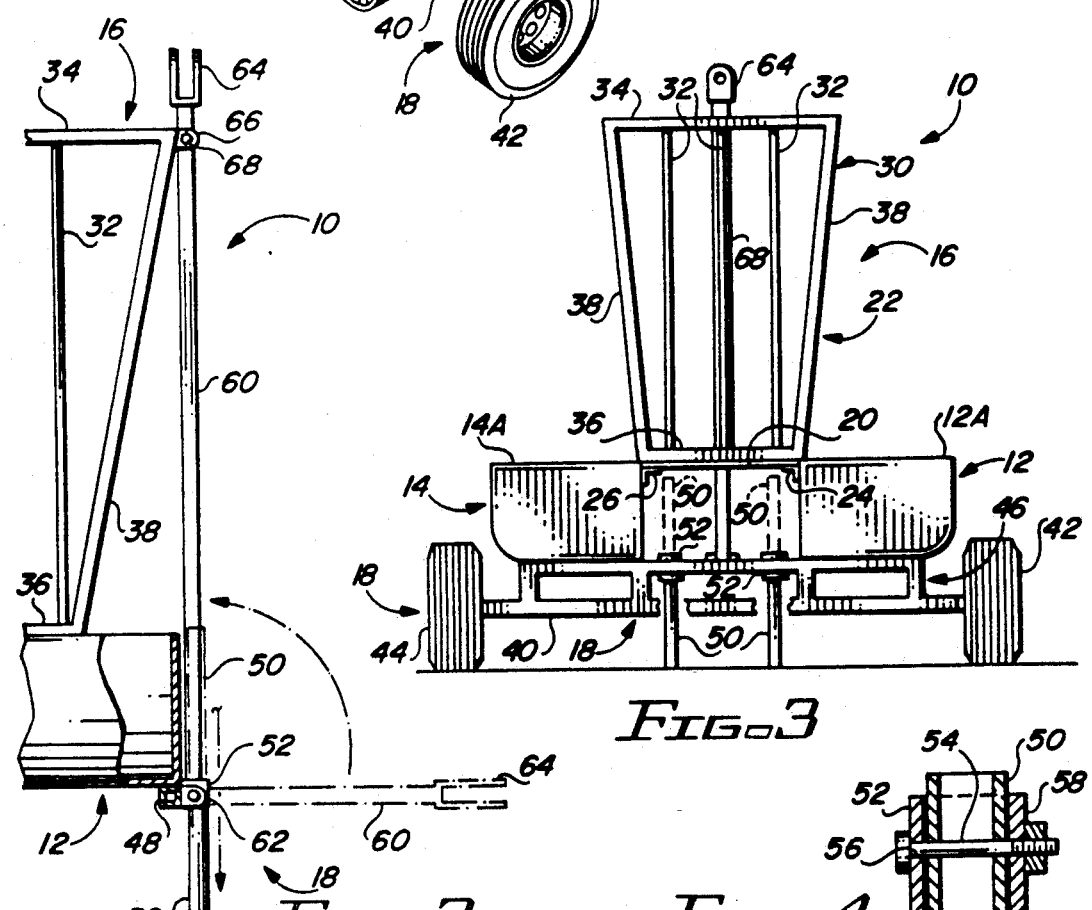

PORTABLE MOBILE RACK AND TROUGH TYPE LIVESTOCK FEEDER

BACKGROUND OF THE INVENTION

1. Field of the Invention

The present invention generally relates to portable feeders and, more particularly, is concerned with a portable mobile feeder for livestock.

2. Description of the Prior Art

Portable livestock feeders of various constructions have been used for many years. Commonly, such feeders include a feed container or enclosure mounted on a movable chassis, either having wheels or skids, which may be attached to a pickup truck or tractor for transport to a pasture or wherever livestock are confined. Typically, such feeders are constructed for use to feed either flowable granular-type feed material, such as grains or ground feed materials, or stem roughage-type feed material, such as hay, but not both, to livestock.

As a result, operations which feed livestock, such as cattle, need to have both types of feeders on hand to use for these different feeding purposes. This practice increases the cost of livestock feeding operations and requires extra work and time in having to transport feed materials to more than one feeder.

Consequently, a need exists for a mobile feeder which will accommodate the feeding of both types of feed material so as to avoid the problems which have resulted from past practices.

SUMMARY OF THE INVENTION

The present invention provides a portable mobile livestock feeder designed to satisfy the aforementioned need. The portable mobile livestock feeder of the present invention comprises (a) a pair of feeding troughs for holding a flowable granular-type of feed material; (b) a feeding hopper for holding stem roughage-type feed material; and (c) means for supporting the feeding troughs and feeding hopper in a generally level stationary relation to the ground surface and for movement across the ground surface.

The feeding troughs of the feeder extend longitudinally in laterally spaced relation to one another and have open tops through which livestock can reach to eat granular-type feed material from the feeding troughs. The feeding hopper of the feeder is disposed between and extends above the feeding troughs and includes a floor disposed between the feeding troughs at the same level as the open tops of the feeding troughs and an enclosure disposed above the floor and extending above the floor and feeding troughs.

The enclosure of the feeding hopper has a plurality of spaced vertical side openings extending above the feeding troughs through which livestock can reach above and over the feeding troughs to eat stem roughage-type feed material from the feeding hopper. The enclosure includes a peripheral frame having opposite sides and opposite ends and a multiplicity of generally elongated straight rods mounted in laterally spaced relation to one another along the opposite sides and ends of the frame so as to defined the side openings of the feeding hopper.

The peripheral frame of the enclosure includes a plurality of rigidly interconnected upper and lower horizontal elongated members. The lower horizontal members is attached to the floor. The peripheral frame also includes a plurality of generally upright elongated members extending between and rigidly interconnecting the horizontal elongated members so as to define therewith an inverted pyramidal-shaped rigid structure. The elongated straight rods extend vertically upwardly and outwardly relative to the floor of the hopper and are disposed between and attached to the upper and lower horizontal members.

More particularly, the supporting means of the feeder includes an axle extending below and in transverse relation to the feeding troughs, a pair of wheels being rotatably mounted at opposite ends of the axle and disposed outwardly from the feeding troughs, and a framework extending below, downwardly from, and in transverse relation to the feeding troughs. The framework rigidly interconnects the axle adjacent to the bottom rear portions of the feeding troughs.

The supporting means of the feeder also includes a transverse member extending between and attached to front portions of the feeding troughs, at least one support leg vertically slidably adjustable relative to the transverse member between a lowered front support position and a raised stored position. The supporting means further includes an elongated tongue pivotally connected at a rear end to the transverse member and having a connecting element at a front end. The tongue is pivotal between a horizontal towing position and a vertical storage position.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a top perspective view of a portable mobile livestock feeder of the present invention.

FIG. 2 is an enlarged fragmentary side elevational, partly sectioned, view of the livestock feeder.

FIG. 3 is a rear elevational view of the livestock feeder.

FIG. 4 is an enlarged fragmentary sectional view of a support leg and collar for stationarily supporting a front end of the livestock feeder.

DETAILED DESCRIPTION OF THE INVENTION

Referring to the drawings, and particularly to FIG. 1, there is illustrated a portable mobile livestock feeder, generally designated 10, constructed in accordance with the principles of the present invention. The livestock feeder 10 basically includes a pair of right and left feeding troughs 12, 14 for holding a flowable particulate or granular-type of feed material, a middle feeding hopper 16 for holding a stem roughage-type feed material, and means 18 for supporting the feeding troughs 12, 14 and the feeding hopper 16 in a generally level stationary relation to the ground surface. The supporting means 18 also adapts the livestock feeder 10 for movement across the ground surface behind a towing vehicle, such as a pickup or tractor.

Referring to FIGS. 1-3, the elongated feeding troughs 12, 14 of the livestock feeder 10 extend longitudinally in laterally spaced relation to one another and have open tops 12A, 14A through which livestock can reach to eat granular-type feed material from the feeding troughs. The feeding troughs 12, 14 are generally elongated hollow bodies having the open tops 12A, 14A and extending in generally parallel relation to one another.

The feeding hopper 16 of the livestock feeder 10 is disposed between and extends above the feeding troughs 12, 14. The feeding hopper 16 basically includes a floor 20 and an enclosure 22 disposed above the floor 20 and extending above the floor 20 and feeding troughs 12, 14. In one exemplary form, the floor 20 is a flat panel disposed between the feeding troughs 12, 14, extending generally at the same level as the open tops 12A, 14A of the feeding troughs. The floor 20 is attached along its opposite longitudinal extending edges to the inner upper peripheral edge portions of the feeding troughs 12, 14 by elongated angle braces 24, 26.

The enclosure 22 of the feeding hopper 16 has a plurality of spaced vertical side openings 28 extending above the feeding troughs 12, 14 through which livestock can reach above and over the feeding troughs 12, 14 to eat stem roughage-type feed material from the feeding hopper 16. With such arrangement of the floor 20 of the feeding hopper substantially at the same level as the open tops 12A, 14A of the feeding troughs 12, 14, any leaves and other edible pieces of the roughage-type feed material pulled out and dropped from the feeding hopper 16 by the livestock will fall into and be caught by the feeding hoppers 12, 14 where the feed material will still be readily available for the livestock to consume so that the feed material will not become scattered and trampled underfoot and become wasted on the ground.

More particularly, the enclosure 22 includes a peripheral frame 30 having opposite sides and opposite ends and a multiplicity of generally elongated straight rods 32 mounted in laterally spaced relation to one another along the opposite sides and ends of the frame 30 so as to defined the plurality of side openings 28 of the feeding hopper 16. The peripheral frame 30 of the enclosure 22 includes a plurality of rigidly interconnected upper and lower horizontal elongated members 34, 36. The lower horizontal members 36 is attached to the floor 20. The peripheral frame 30 also includes a plurality of generally upright elongated members 38 extending between and rigidly interconnecting the upper and lower horizontal elongated members 34, 36 so as to define therewith an inverted pyramidal-shaped rigid structure. The elongated straight rods 32 extend vertically upwardly and outwardly relative to the floor 20 of the feeding hopper 16 and are disposed between and attached to the upper and lower horizontal members 34, 36.

Referring still to FIGS. 1-3, the supporting means 18 of the livestock feeder 10 includes an elongated axle 40 extending below and in transverse relation to the feeding troughs 12, 14, a pair of right and left wheels 42, 44 being rotatably mounted at the opposite ends of the axle 40 and disposed outwardly from the feeding troughs 12, 14, and a reinforcing framework 46 extending below, downwardly from, and in transverse relation to the feeding troughs 12, 14. The framework 46 rigidly interconnects the axle 40 adjacent to the bottom rear portions of the feeding troughs 12, 14. The wheels 42, 44 support the livestock feeder 10 both for movement between locations and for stationarily positioning the feeder 10 for use in feeding the livestock.

Referring to FIGS. 1-4, the supporting means 18 also includes a transverse member 48 extending between and attached to front portions of the feeding troughs 12, 14, and at least one and preferably a pair of laterally spaced support legs 50 vertically slidably mounted by a pair of spaced collars 52 attached to the transverse member 48. In the example illustrated, the support legs 50 and collars 52 are cylindrical in configuration. Other shapes can be employed. The support legs 50 are adjustable vertically relative to the transverse member 48 and collars 52 between a lowered front support position, as shown in dashed line form in FIG. 1 and in solid line form in FIGS. 2 and 3, and a raised stored position, as shown in dashed line form in FIG. 2. Fasteners 54 are inserted through holes 56 in the collars 52 when aligned with holes 58 defined through the upper and lower ends of the support legs 50 to retain the legs at either the lowered or raised positions.

The supporting means 18 further includes an elongated tongue 60 pivotally connected at a rear end between a pair of tabs 62 fixed on and projecting forwardly from the front transverse member 48. The tongue 60 has a clevis 64 attached at a front end for coupling the tongue 60 to the towing vehicle. The tongue 60 is pivotal between a horizontal towing position, as shown in solid line form in FIG. 1 and in dashed line form in FIG. 2, and a vertical storage position, as shown in solid line form in FIGS. 2 and 3. Another pair of tabs 66 are fixed on the front upper horizontal member 34 of the peripheral frame 30 and adapted to receive a fastener 68 for securing the tongue 60 in the storage position.

From the above description of the livestock feeder 10 and in view of FIGS. 1-3, it can be readily understood that the combination of the pair of right and left feeding troughs 12, 14 together with the rear axle framework 40, 46 attached to and underlying the rear bottom portions of the feeding troughs 12, 14 and the wheels 42, 44 rotatably mounted at opposite ends of the axle framework 40, 46 and with the front transverse member 48 attached to the front portions of the feeding troughs 12, 14, comprise a pull-type mobile frame. Also, it can be readily realized that the front transverse member 48 is spaced forwardly of and separate from rear axle framework and is interconnected with the rear axle framework 40, 46 solely through the structure of the feeding troughs 12, 14.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A portable mobile livestock feeder, comprising:
    (a) a pull-type mobile frame including
        (i) a pair of feeding troughs for holding a flowable granular-type of feed material, said feeding troughs extending longitudinally in laterally spaced relation to one another and having open tops through which livestock can reach to eat the granular-type feed material from said feeding troughs,
        (ii) a rear axle framework disposed below and attached to respective bottom rear portions of said feeding troughs and extending below and in transverse relation to said feeding troughs, (iii) a pair of wheels being rotatably mounted at opposite ends of said axle framework and disposed outwardly from said feeding troughs, (iv) a front transverse member extending between and attached to front portions of said feeding troughs, said front transverse member being spaced forwardly of and separate from said rear axle framework and being interconnected with said rear axle framework solely through said feeding troughs, and (v) an elongated tongue connected at a rear end to said transverse member and having a connecting element at a front end; and (b) a feeding hopper for holding a stem roughage-type feed material, said feeding hopper being disposed between and extending above said feeding troughs, said feeding hopper including a floor disposed between and connected along opposite lateral edges to said feeding troughs substantially at the same level as said open tops of said feeding troughs and spaced above said rear axle framework and front transverse member, said feeding hopper also including an enclosure disposed above said floor and extending above said floor and feeding troughs, said enclosure having a plurality of spaced vertical side openings extending above said feeding troughs through which livestock can reach above and over said feeding troughs to eat roughage-type feed material from said feeding hopper.

2. The feeder of claim 1 wherein said feeding troughs are generally elongated hollow bodies and extend in generally parallel relation to one another.

3. The feeder of claim 1 wherein said enclosure of said feeding hopper includes:

a peripheral frame having opposite sides and opposite ends; and a multiplicity of generally elongated straight rods mounted in laterally spaced relation to one another along said opposite sides and ends of said frame so as to defined said side openings of said feeding hopper.

4. The feeder of claim 3 wherein said peripheral frame includes:

a plurality of rigidly interconnected upper and lower horizontal elongated members, said lower horizontal members being attached to said floor; and a plurality of upright elongated members extending vertically upwardly and outwardly between and rigidly interconnecting said horizontal elongated members so as to define therewith an inverted pyramidal-shaped rigid structure.

5. The feeder of claim 4 wherein said elongated straight rods extend vertically upwardly and outwardly relative to said floor of said feeding hopper and are disposed between and attached to said upper and lower horizontal members.

6. The feeder of claim 1 wherein said pull-type mobile frame also includes at least one support leg attached to and vertically slidably adjustable relative to said transverse member between a lowered front support position and a raised stored position.

7. The feeder of claim 1 wherein said tongue is pivotally connected at said rear end to said transverse member, said tongue being pivotal between a horizontal towing position and a vertical storage position.

* * * * *